United States Patent [19]

Balogh et al.

[11] Patent Number: 5,171,943
[45] Date of Patent: Dec. 15, 1992

[54] TUBEWAVE DAMPER PROBE FOR SEISMIC APPLICATIONS

[76] Inventors: William T. Balogh, 6119 Windbrooke, San Antonio, Tex. 78249; John T. O'Brien, 9719 Misty Trail, San Antonio, Tex. 78250

[21] Appl. No.: 645,061

[22] Filed: Jan. 23, 1991

[51] Int. Cl.⁵ .............................................. G01V 1/40
[52] U.S. Cl. .................................... 181/102; 367/911
[58] Field of Search ........................ 367/25, 86, 911; 181/102, 106

[56] References Cited

U.S. PATENT DOCUMENTS

| | | | |
|---|---|---|---|
| 4,858,718 | 8/1989 | Chelminski | 181/106 |
| 5,005,666 | 4/1991 | Fairborn | 181/102 |

Primary Examiner—Ian J. Lobo
Attorney, Agent, or Firm—Pravel, Gambrell, Hewitt, Kimball & Krieger

[57] ABSTRACT

A tubewave damper probe for the suppression of borehole tubewaves in seismic applications is disclosed. The damper probe is suspended into a borehole by means of a cable and is comprised of a housing, a gas-filled bladder within the housing, and a plurality of valves located on the housing. The damper probe operation is based on a modified Helmholtz resonator effect. The bladder is precharged before insertion into the borehole, and pressure variations within the borehole cause the bladder to expand or contract. The valves are designed such that expansion of the bladder causes the valves to close, and contraction of the bladder causes the valves to open. The valves also prevent over-expansion of the bladder.

3 Claims, 7 Drawing Sheets

TUBEWAVE DAMPER PROBE FOR SEISMIC APPLICATIONS

FIELD OF THE INVENTION

The present invention relates generally to damping systems for suppressing acoustic waves and, more specifically, the invention relates to damping probes for suppressing borehole tubewaves in geophysical and seismic applications.

BACKGROUND

Borehole tubewaves, as they relate to seismic and borehole geophysical applications, are hydraulically propagating acoustic waves which propagate up and down oil well boreholes. The borehole fluid used in such applications serves as the tubewave propagation medium. The borehole casing and geologic formation immediately surrounding the borehole can effect the impedance of the propagating medium; accordingly, the borehole conditions can affect tubewave propagation, although the vast majority of the tubewave energy is present in the borehole fluid.

Tubewaves may be so prolific in certain borehole environments such that they can significantly mask the seismic signals of interest in a particular application.

Tubewaves can be generated either in a source or detector borehole. A source borehole is a borehole in which a seismic source is used to create seismic signals in and/or around a specific geologic formation of interest. Source boreholes are used in inverse vertical-seismic-profiling (VSP) and borehole-to-borehole seismics. The actual mechanisms involved in the creation and propagation of tubewaves are not fully understood; however, it is known that tubewaves are generated in source boreholes. A detector borehole is a borehole in which seismic detectors are used to measure a vector or scalar component of seismic signals propagating in the geologic formation immediately surrounding the borehole. Detector boreholes are used in VSP as well as borehole-to-borehole seismics. Detector borehole tubewaves appear to be generated as a result of seismic signals which impact the borehole at high angles of incidence.

Upon creation, tubewaves appear to travel up and down the borehole with little or not attenuation. Tubewave propagation is theoretically equivalent to electromagnetic propagation in a transmission line. When a tubewave encounters the upper or lower end of the borehole, most of the tubewave energy is reflected, resulting in a borehole tubewave traveling in the opposite direction. Some of the tubewave energy is radiated into the surrounding geological formation as a secondary source. Similarly, when tubewaves encounter borehole anomalies such as casing shoes or significant variations in the cement bonding which surrounds the borehole, a portion of the tubewave continues to propagate in its original direction, a portion is reflected and propagates in the opposite direction, and a portion is radiated as a secondary source.

Suppression of borehole tubewaves in seismic applications significantly enhances the signal-to-noise ratios attainable in the borehole environments, thus reducing or eliminating their masking effect on seismic signals of interest. Conventional tubewave suppression techniques of the prior art have primarily involved plugging of the borehole. Although this method may reduce or eliminate the amplitude of the tubewave propagating past the plug, it fails to completely solve the problem. The plug presents an impedance mismatch which is clamped to the borehole; accordingly, tubewave energy is can be emitted as a secondary source. Further, a mechanical plug is difficult to install and remove, thus complicating operations.

Alternative methods of tubewave suppression involve the use of side branches to the main pipe; these side branches may be orifices or may be Helmholtz resonators. Referring now to FIG. 1A, the use of a Helmholtz resonator H as a side branch to a main pipe P is shown. The hydraulic disturbance, or tubewave, is propagating in the main pipe with an incident pressure amplitude of $p_i$. The impedance contrast $Z_b$ presented by the Helmholtz resonator allows some of the hydraulic disturbance to propagate past the resonator with a pressure amplitude of $p_t$. A portion of the signal will be reflected with pressure amplitude of $p_r$. The theoretical performance of this resonator configuration has been defined in the literature; see *Fundamental of Acoustics*, L. E. Kinsler, A. R. Frey, John Wiley & Sons, Inc., New York, 1962, pp. 186-213. The transmission coefficient, $a_t$, is defined as $p_t/p_i$. Referring now to FIG. 1B, a graph plotting the transmission coefficient versus relative frequency for the Helmholtz resonator configuration of FIG. 1A is shown. This resonator configuration can provide significant reductions in the amplitude of hydraulic disturbances traveling past the resonator side branch but only for a very narrow band of frequencies. Thus, the Helmholtz resonator branch of FIG. 1A forms a narrow band notch filter.

Referring now to FIG. 2A, the use of an orifice O as a side branch to a main pipe is shown. The orifice of FIG. 2A is ideally a vent into an infinite compliance. Hydraulic disturbances within the main pipe P are attenuated as they propagate past the vent. For an orifice branch into an infinite compliance, the transmission coefficients, $a_t$, is $1/[1+(K/k)]$, The value k is the wavelength constant, and is defined as $2\pi f/c$, where f=frequency and c=velocity of propagation.

For an orifice branch with a pipe length much smaller than the orifice radius, K is defined as $\pi a/3.4S$, where a is the orifice radius and S is the cross-sectional area of the main pipe.

Referring now to FIG. 2B, a graph of the transmission coefficient for the orifice branch with respect to relative frequency is shown. The orifice branch acts as a high-pass filter with respect to the hydraulic signal passing the branch, and reduces the amplitude of low-frequency hydraulic signals. Such a configuration is not practically possible because an orifice branch in an actual borehole would not serve as a vent to an infinite compliance.

Referring now to FIG. 3A, a side branch employing a modified Helmholtz resonator H' is shown. The modified Helmholtz resonator H' includes a gas-filled region G and a liquid-filled region L. This configuration closely approximates that of the orifice branch configuration, since the modified Helmholtz resonator's gas filled-region G enables the resonator to act like an infinitely large compliance for low volumetric changes of the gas. At very low frequencies, the volumetric changes experienced by the gas/liquid filled region will be such that it no longer behaves as an infinitely large compliance and the probe will exhibit a higher transmission coefficient. A graph of the transmission coefficient versus relative frequency for both the ideal response and for the modified-Helmholtz response is shown in FIG. 3B.

Hydraulic desurgers or accumulators have been used in a variety of oil field applications, most notably as mud pump desurgers. In general, these desurgers are similar to the modified Helmholtz resonator of FIG. 3A and are composed of a large gas-filled bladder which is exposed to the hydraulic field. The desurger bladder is highly flexible and serves only to separate the gas from the fluid. Because the desurgers are gas-filled and their volume relatively large, very small pressure changes at the fluid-gas interface result in relatively large volumetric changes of the gas. Thus, the desurger maintains a relatively constant pressure at the fluid-gas interface. ICO Inc., Houston, Tex. is currently developing a borehole oil well desurger which works on much the same principal as conventional desurgers. The device is attached to production tubing and placed at the bottom of the borehole. The purpose of the device is to reduce the amplitude of pressure surges on production formations associated with production pump jacks. The design is composed of an outermost cylindrical region which is gas filled. The oil production products flow through the center of the desurger. A high strength specially designed cylindrical bladder separates the production flow from the gas.

This constant pressure effect of the desurger can be observed when desurgers are used on positive displacement mud pumps. With mud pumps, large flow fluctuations in the output of the mud pump will cause very large pressure fluctuations. A desurger can reduce these variations by more than 90 percent.

Although the application of desurger techniques to the attenuation of tubewaves appears to be straightforward, many practical engineering and construction problems exist. For example, if a standard desurger with a bladder precharged or pre-pressurized to near surface pressure is used in a borehole tubewave environment, the bladder volume will be too small at borehole hydrostatic pressures to properly absorb the flow variations attributed to tubewaves. If a specialized rigid bladder is used to allow precharging to the expected borehole hydrostatic pressure while at the surface, the rigidity of the bladder will ultimately restrict the compliance of the desurger and reduce its overall effectiveness. An active desurger which varies the precharge on a flexible bladder so that it is always approximately equal to the borehole hydrostatic pressure would be relatively complex and would likely exhaust gases into the borehole upon retrieval of the probe.

In view of the foregoing discussion, a desirable tubewave damping probe would suppress a borehole hydraulic disturbance as it passes the probe without totally blocking the borehole and/or clamping to the borehole. It would also be desirable for a tubewave damping probe to have a flexible gas-filled bladder which maintains a constant pressure for the suppression of borehole hydraulic disturbances. Further, it would be desirable for a tubewave damping probe to have means for preventing the over-expansion of a gas-filled bladder in seismic applications, such as upon retrieval of a probe with a precharged bladder. In addition, it would be desirable for a tubewave damping probe to employ multiple damping devices to achieve improved suppression and to employ selective restriction of hydraulic flow past the borehole device to improve the high frequency performance.

SUMMARY OF THE INVENTION

Accordingly, the present invention provides for a tubewave damper probe which is intended to suppress or eliminate the tubewaves which propagate past the probe device. The probe performs much like a conventional desurger yet is uniquely packaged and hardened for borehole environments. The probe utilizes a modified Helmholtz resonator for attenuation of wide bandwidth borehole hydraulic disturbances. The tubewave damper of the present invention utilizes a flexible gas-filled bladder which is precharged at the surface to the nominal borehole pressure and which maintains a constant pressure for the suppression of borehole hydraulic disturbances. This high pressure surface precharge can be accomplished without bladder rupture because the desurger employs mechanical stops to limit the expansion of the bladder. The probe apparatus does not totally block nor clamp to the borehole. The probe may employ multiple damper devices to achieve improved suppression and may employ selective restriction of hydraulic flow past the device to improve high frequency performance. The probe of the present invention also may employ a specialized valve which uses the force of the expanding bladder to close and automatically opens as the bladder is compressed. This valve maximizes flow cross-sectional area while reducing the hydraulic distance from the borehole disturbance to the bladder.

DETAILED DESCRIPTION OF THE PREFERRED EMBODIMENT

Figure 4:
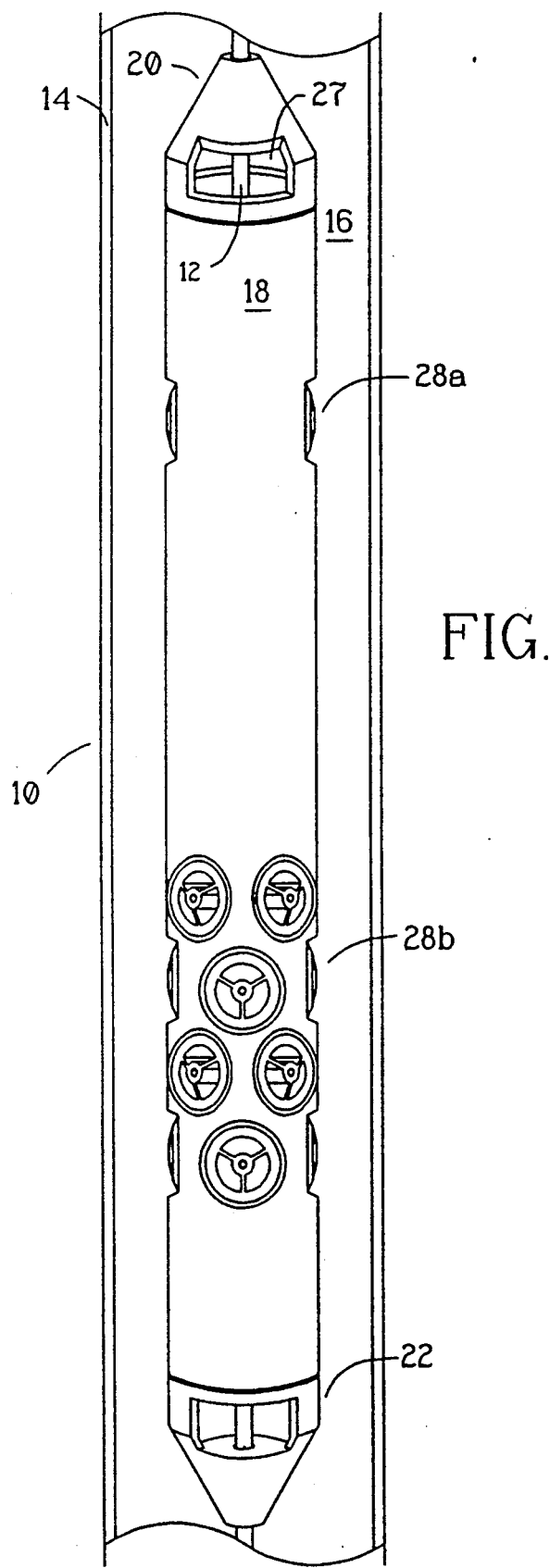
FIG. 4 is a diagrammatic representation of a tubewave damper probe according to a preferred embodiment of the present invention.
Figure 6A:
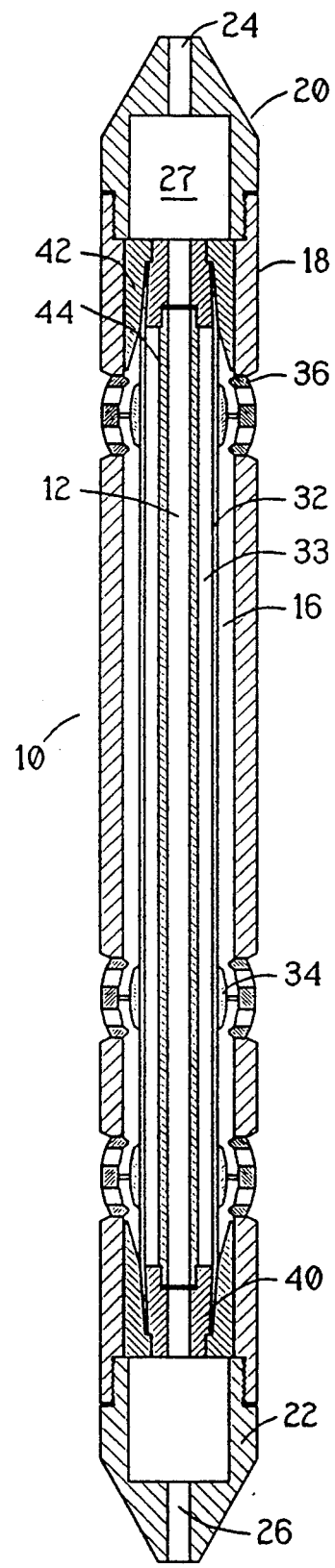
FIGS. 6A-B are vertical cross-sections of the probe of FIG. 4 which illustrate the mechanical positions of the probe components in two states of operation.

Referring now to FIGS. 4 and 6A, a tubewave damper probe 10 according to a preferred embodiment of the present invention is shown. The probe 10 is suspended from a cable 12 in an oil well borehole or casing pipe 14 and is surrounded by borehole fluid 16. In such an application, tubewaves may propagate through the borehole fluid 16. The probe 10 has an outer housing 18, and upper and lower end cap assemblies 20 and 22 which have integral wireline clamps 24 and 26 to attach the probe 10 to the cable 12. A bladder is contained within the outer housing 18, and will be discussed in greater detail below. The end cap assemblies 20 and 22 also provide protection and allow access 27 to the bladder precharge port and valve, and support the bladder assembly axial load. The outer housing 18 also includes eighteen valve assemblies 28; these include two upper valve assemblies 28a and sixteen lower valve assemblies 28b. The valve assemblies will be discussed in greater detail below.

Figure 5A:
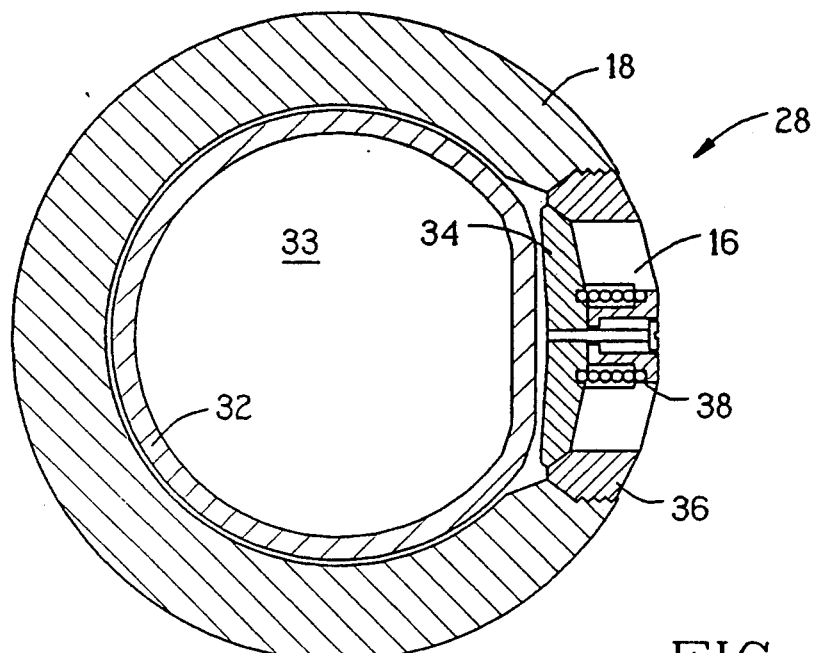
FIGS. 5A-B are diagrammatic representations of the probe valve assemblies of FIG. 4 in two states of operation.
Figure 5B:
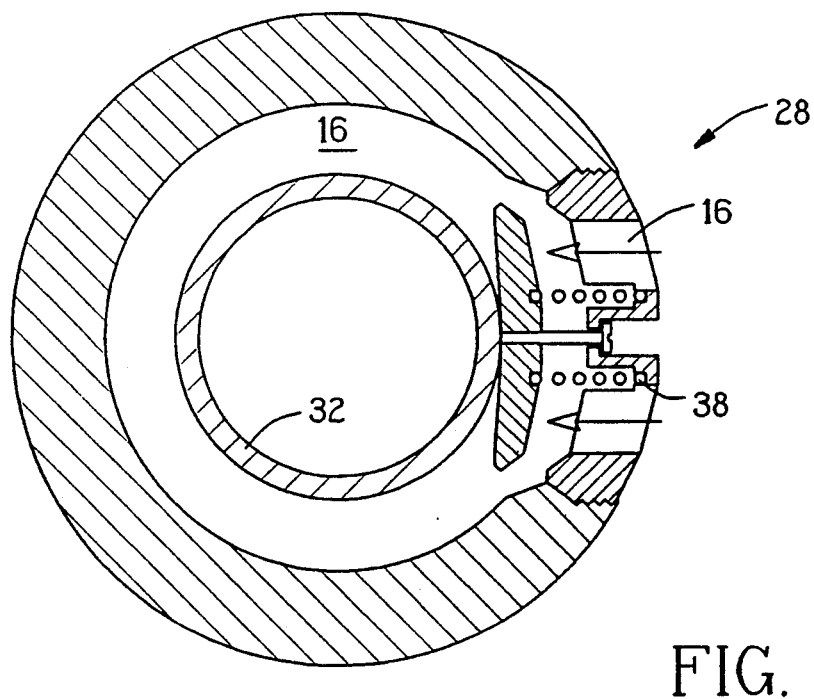

Referring now to FIGS. 5A and 5B, the valve assemblies 28 are shown in greater detail. FIG. 5A shows the probe valve assembly state of operation at the surface. The valve 28, with the bladder 32 precharged to a pressure which may be roughly equal to the hydrostatic pressure at minimum operating depth. The bladder 32 is preferably a gas-filled, cylindrical bladder which may be filled with nitrogen 33. When the bladder 32 is precharged at the surface, valve plate 34 is forced closed by the expanding bladder 32. When the valve 30 is closed, the pressure forces caused by the expanding bladder 32 are applied to the valve plate 34 and are transferred to the housing 18 through valve shoulder 36. The valve 30 does not provide an air-tight or water-tight seal; instead, the expanded bladder itself forms a seal after all water and air have been expelled from the interior of the housing 18.

FIG. 5B shows the position of the probe valve assembly 28 when either the probe 10 is at the surface and the bladder 32 has not been precharged or when the borehole hydrostatic pressure is significantly greater than the bladder precharge pressure. In either case, a small relatively low-force spring 38 maintains the valve in an open position. In the latter case, borehole fluid 16 passes through the valve and fills the region between the bladder 32 and the housing 18. The valve 28 is ideally specially designed to provide a large cross-sectional flow area when open.

Figure 6B:
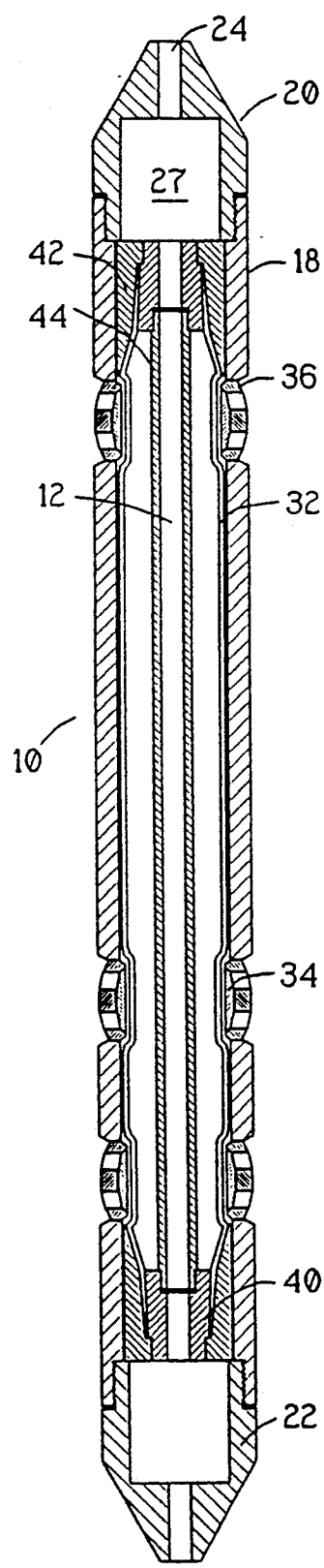

Referring now to FIGS. 6A-B, vertical cross-sections of the probe 10 are shown. FIG. 6A illustrates the mechanical positions of the components when the probe is at the surface and the bladder precharge has been released or when the probe is in the borehole and the bladder is compressed by the borehole hydrostatic pressure. The probe 10, in addition to the components previously mentioned, further includes an inner and an outer bladder clamp assembly 40 and 42. The bladder clamp assemblies 40 and 42 provide an end-sealant support for the bladder 32. The inner bladder clamp 40 also provides a connection to wireline pass-through tubing 44 and has a mounting for the precharge valve and port assemblies (not shown). The wireline pass-through tubing 44, according to one embodiment of the present invention, provides a ½ inch inner diameter clearance path through the bladder assembly 32, and receives the cable 12.

The bladder 32 may be centered within the outer housing 18. When in the borehole, the bladder 32 will not maintain the ideal cylindrical shape shown in FIG. 6A. Rather, the bladder 32 will be deformed by buoyant forces such that the top of the bladder 32 will have a larger diameter than the bottom. As shown in FIG. 4, a total of eighteen valves 28 are located in the main outer housing 18. Due to the buoyant deformation during borehole operation, the upper valve assemblies 28a will either remain closed or will only partially open. Therefore, sixteen valve assemblies 28b are located at the lower end of the probe 10 to assure the complete opening of these valves and to minimize overall flow resistance.

Figure 1A:
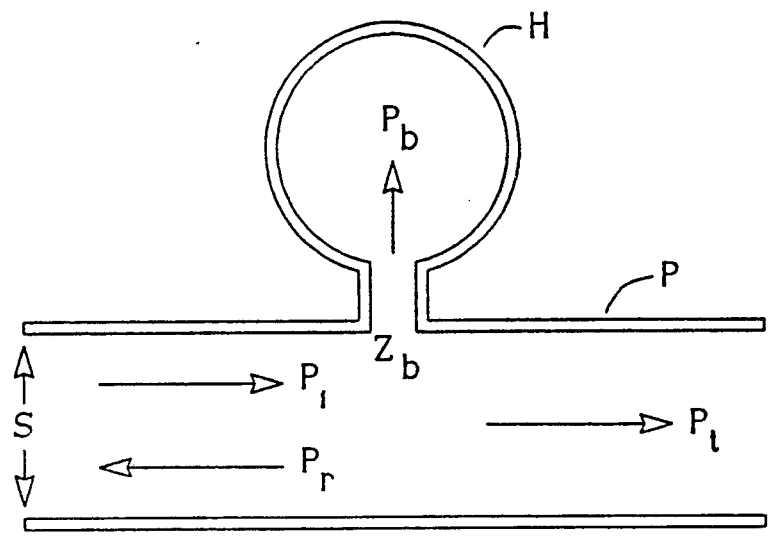
FIG. 1A is a representation of a Helmholtz resonator side branch configuration of a known borehole wave suppression technique.
Figure 1B:
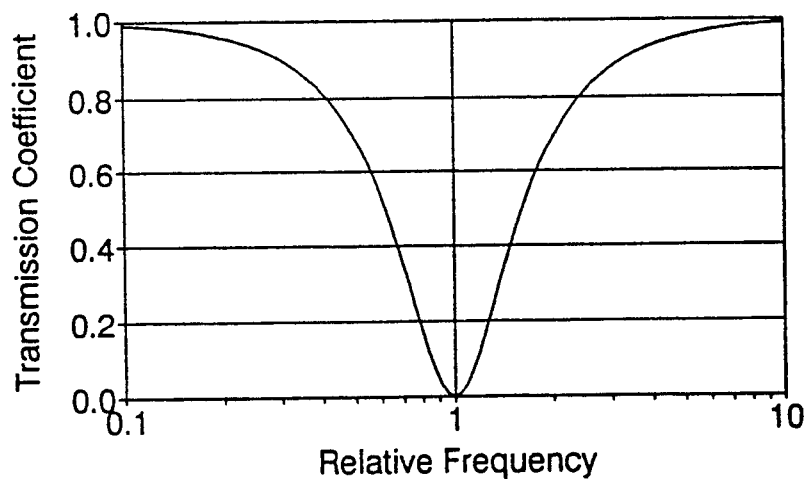
FIG. 1B shows a graphical representation of the transmission coefficient of the configuration of FIG. 1A versus relative frequency.
Figure 2A:
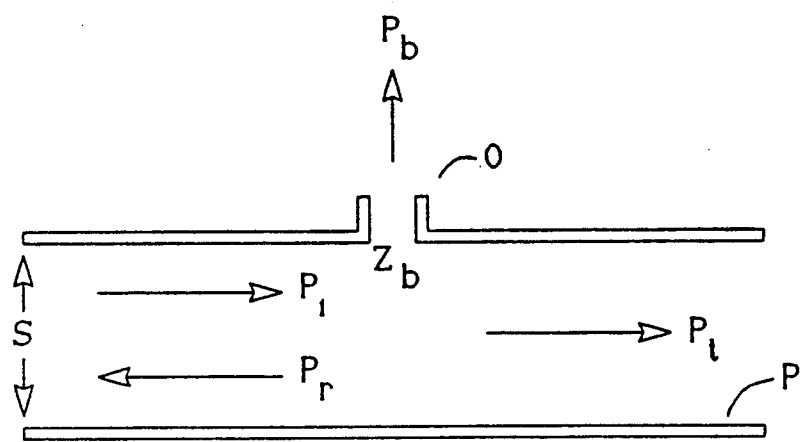
FIG. 2A is a representation of an orifice side branch configuration of a known borehole wave suppression technique.
Figure 2B:
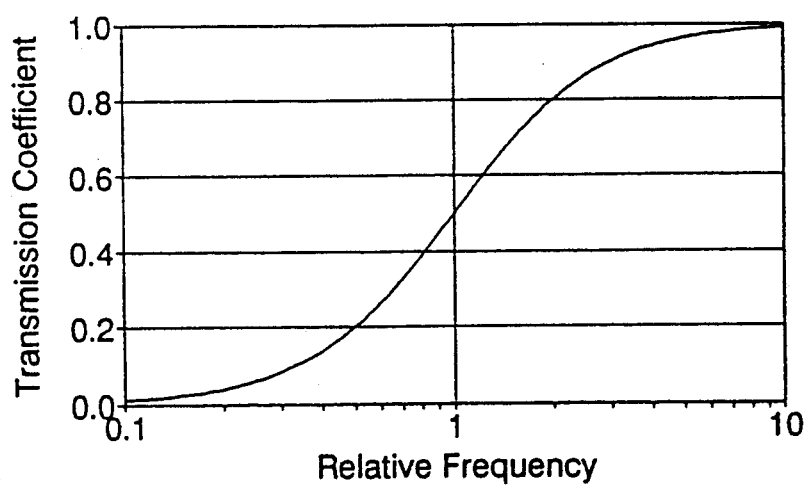
FIG. 2B shows a graphical plot of the transmission coefficient of the configuration of FIG. 2A versus relative frequency.
Figure 3A:
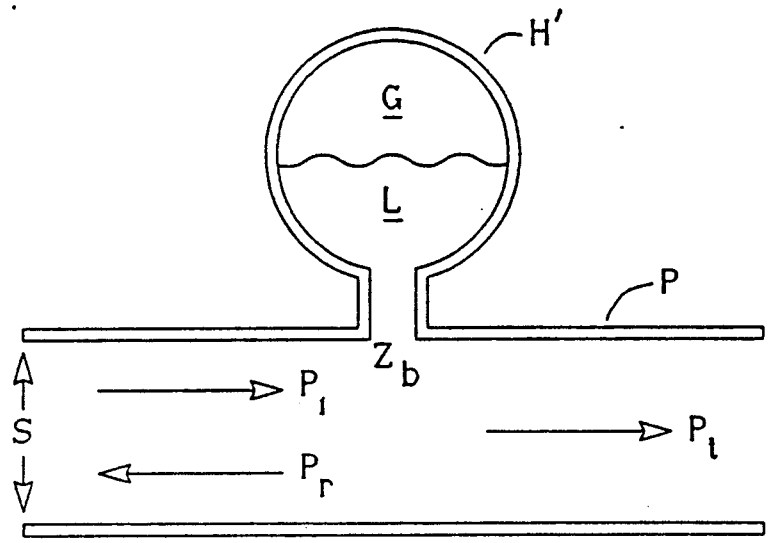
FIG. 3A is a representation of a modified Helmholtz resonator side branch configuration of a known borehole wave suppression technique.
Figure 3B:
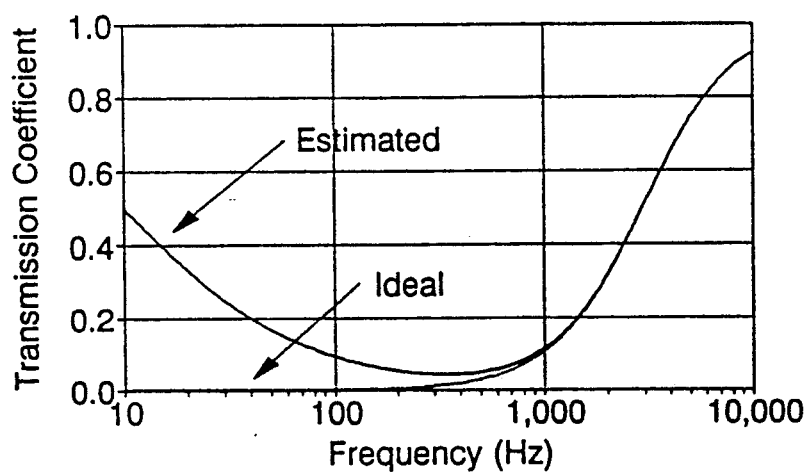
FIG. 3B shows a graphical plot of the transmission coefficient of the configuration of FIG. 3A versus relative frequency.

In operation, borehole tubewaves are attenuated as they pass the valve assemblies 28b near the lower end of the probe 10. The increase in pressure associated with disturbances in the borehole near the valves are fluid coupled to the bladder 32 and result in corresponding compression and expansion of the bladder volume. These volumetric changes reduce the incremental volume flow associated with the borehole disturbances, thus reducing their amplitude. This result is achieved due to the principles associated with the modified Helmholtz resonator as discussed in connection with FIGS. 3A-B; that is, the valves act as an orifice side branch into a nearly infinite compliance for high frequencies.

When the damper probe 10 is retrieved from the borehole 14, the hydrostatic pressure of the fluid column becomes much less than the bladder precharge pressure. If the bladder 32 is not contained, it may expand until it ruptures. FIG. 6B illustrates the manner in which rupture is prevented and identifies the positions of the valves and the bladder during this condition.

The probe 10 is constructed to allow disassembly by field personnel. By removing the valves and one end cap, the entire bladder 32 can be removed and inspected. Preferably, the valve assemblies 28 can be removed, inspected, and replaced if necessary. Following reassembly, the probe 10 is installed in the wireline string by feeding the wireline cable 12 through the probe and clamping the probe to the wireline. According to one embodiment of the present invention, the probe 10 can accept wireline cables 12 with outside diameters up to 15/32 inch.

Immediately before entering the borehole, the probe 10 is precharged to a pressure depending upon the anticipated minimum and maximum borehole operating hydrostatic pressures and temperatures. The damper probe 10 is rated for operation over a minimum-to-maximum depth range of at least 1:3; however, the probe can be used over a greater range with degradation in suppression performance. After the operating depth range has been determined, the bladder 32 is preferably precharged with a gas such as nitrogen to a pressure equal to approximately 80 percent of the hydrostatic pressure at the shallowest depth of interest. Upon retrieval of the probe 10 from the borehole 14, the probe precharge should be released and the probe 10 should be flushed with fresh water.

Although the tubewave damper probe of the present invention has been described in terms of the preferred embodiments, it is not intended to be limited to the specific forms set forth herein. On the contrary it is intended to cover such modifications, alternatives and equivalents as can be reasonably included within the spirit and scope of the claims.

What is claimed is:

1. An apparatus for suppressing borehole hydraulic disturbances, comprising:
   a housing;
   a bladder located within said housing, said bladder including means for allowing a tube to pass therethrough;
   first and second end cap assemblies, said end cap assemblies each having integral wireline clamps for clamping the housing to a borehole cable;

an inner bladder clamp assembly and an outer bladder clamp assembly, said inner and outer bladder clamp assemblies providing an end seal and support for the bladder; and means for allowing passage of fluid through said housing, comprising a plurality of valves located on the surface of said housing.

2. The apparatus of claim 1, wherein said valves comprise: a valve shoulder fixedly attached to said housing, said valve shoulder having an aperture; a valve plate located within said housing; and a spring attached to said valve shoulder and said valve plate; wherein expansion of said bladder causes said valve to close and contraction of said bladder causes said valve to open.

3. The apparatus of claim 2, wherein the majority of said valves are located at the lower end of said housing.

* * * * *